Figure 1:
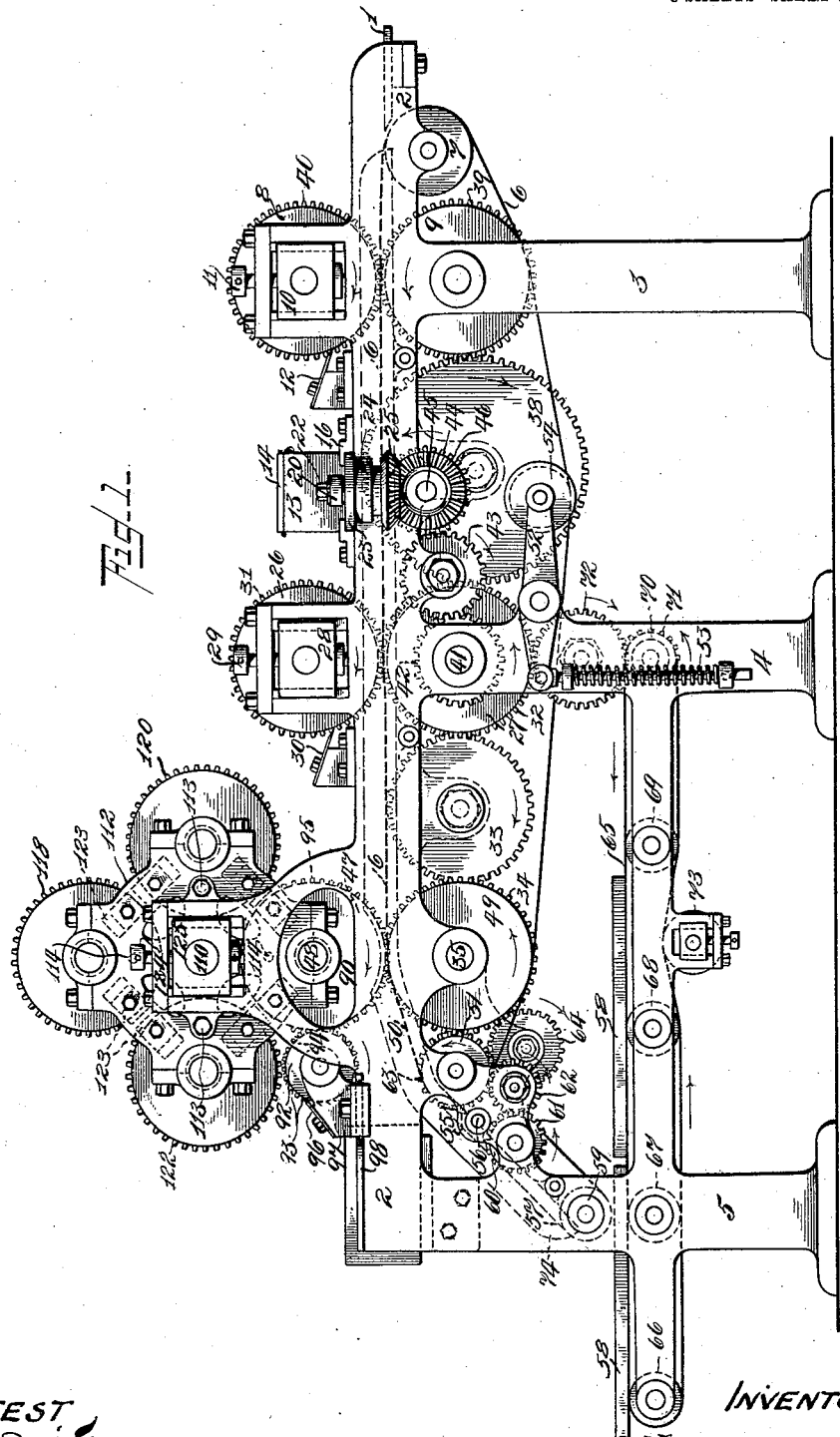

No. 870,249. PATENTED NOV. 5, 1907.
T. C. PATTERSON.
CRULLER CUTTING MACHINE.
APPLICATION FILED JAN. 20, 1904.

3 SHEETS—SHEET 1.

ATTEST
INVENTOR
Thomas C. Patterson

No. 870,249. PATENTED NOV. 5, 1907.
T. C. PATTERSON.
CRULLER CUTTING MACHINE.
APPLICATION FILED JAN. 20, 1904.
3 SHEETS—SHEET 2.
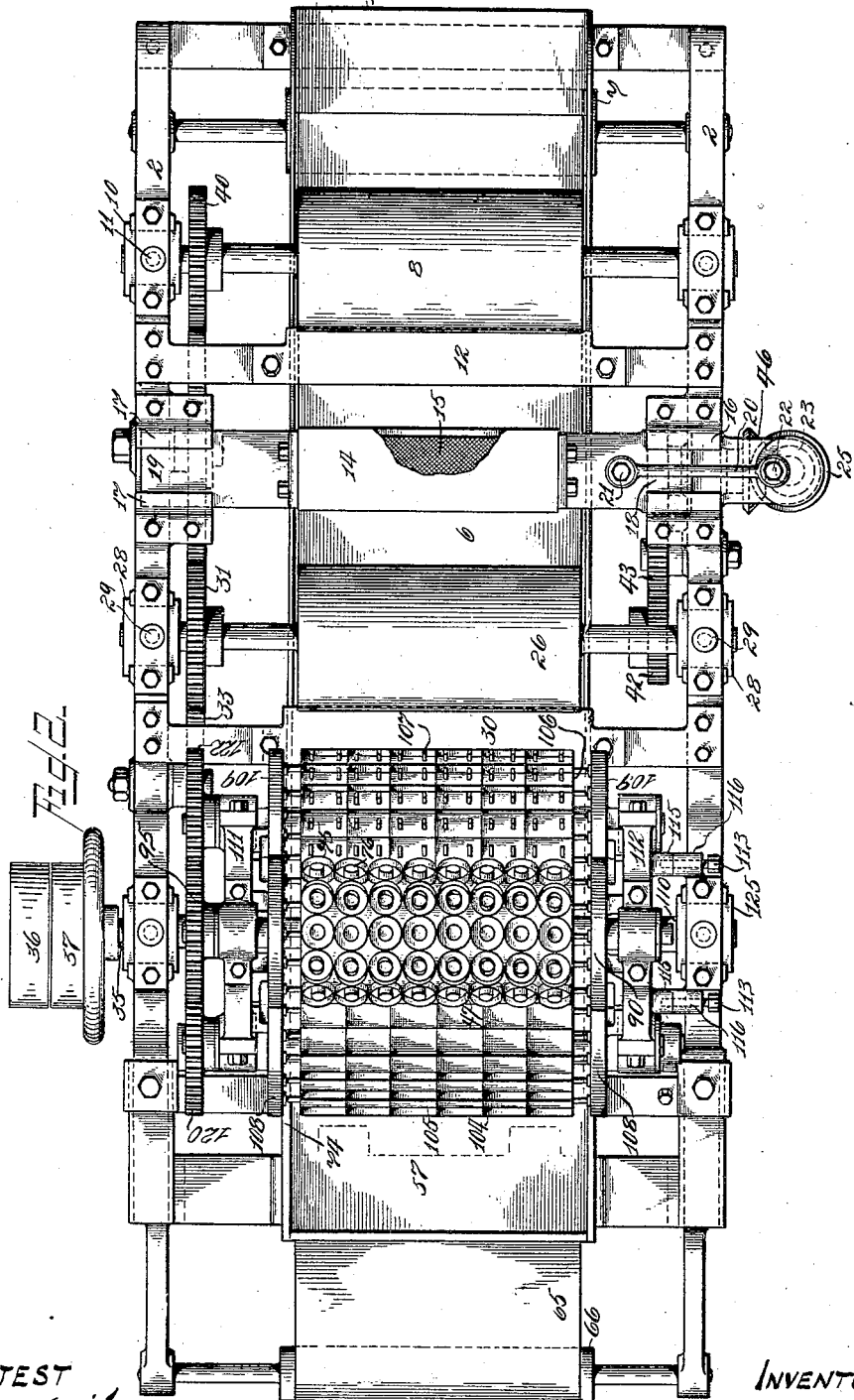
ATTEST
INVENTOR
Thomas C. Patterson.

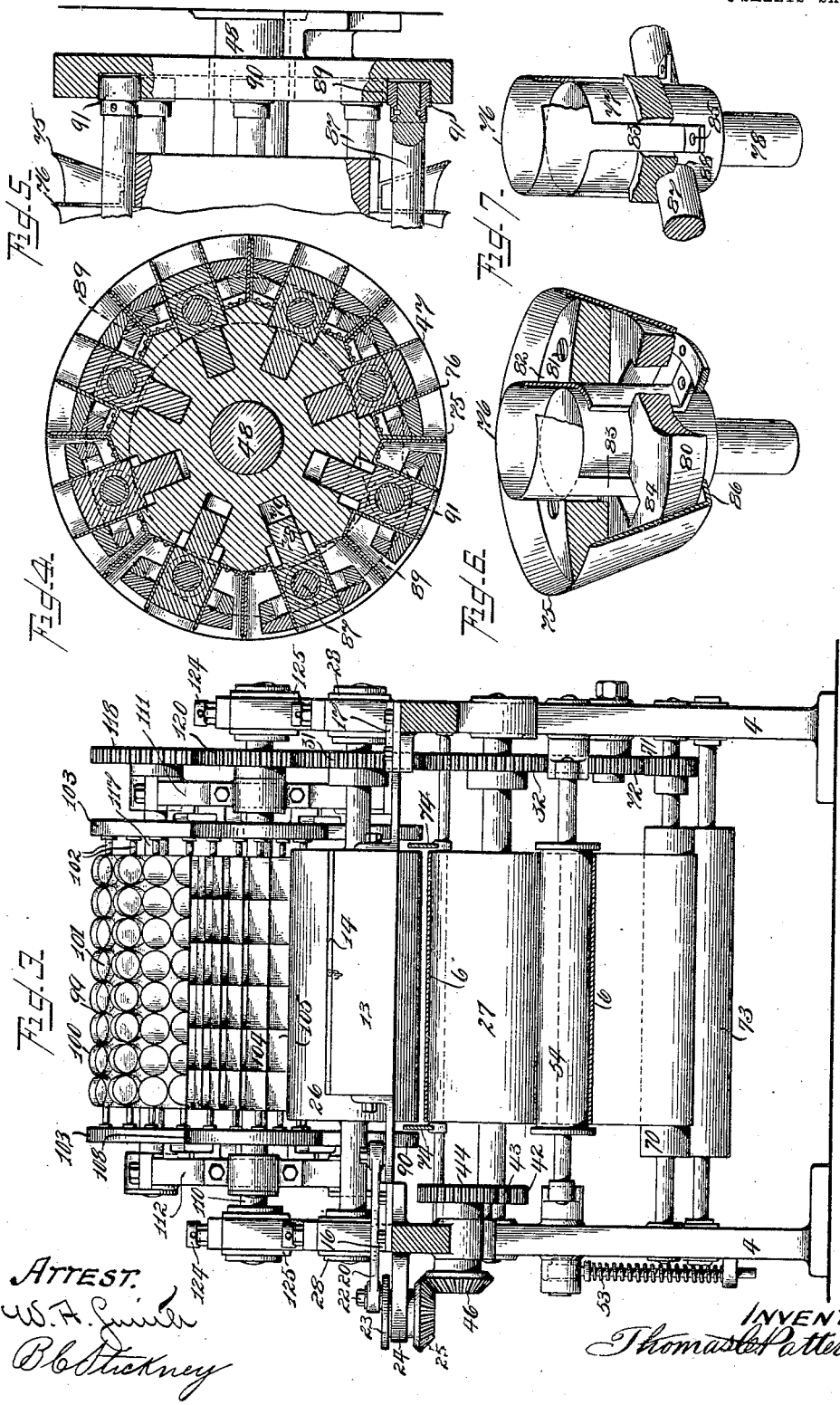

UNITED STATES PATENT OFFICE.

THOMAS C. PATTERSON, OF NEW YORK, N. Y.

CRULLER-CUTTING MACHINE.

No. 870,249.　　　　Specification of Letters Patent.　　　　Patented Nov. 5, 1907.

Application filed January 20, 1904. Serial No. 189,919.

*To all whom it may concern:*

Be it known that I, THOMAS C. PATTERSON, a citizen of the United States, residing in New York, in the county of New York and State of New York, have invented certain new and useful Improvements in Cruller-Cutting Machines, of which the following is a specification.

This invention relates to a machine for cutting ring-like blanks from cruller-dough, as well as blanks of other forms; and the object of the invention is to produce a machine for this purpose which is simple in construction and operation and effective for the end in view.

Cruller-dough is so sticky that it is difficult to handle by machinery; but this difficulty I have overcome at all stages in the operation. I reduce the raw slab of dough to the proper thickness by successive rolling operations, so as not to treat the dough violently; and between these operations I sift flour upon the dough, so as to reduce the liability of its breaking and then sticking to the machinery. I cut the dough into blanks by means of a drum having dies thereon, suitable provision being made for insuring the discharge of the annular blanks from the dies, and for subsequently removing the scraps from the drum. The dies are formed with their opposite sides radial to the die-drum axis, so as to insure cutting the blanks properly, and also to facilitate their discharge.

Other features will hereinafter appear.

In the accompanying drawings, Figure 1 is a side elevation, Fig. 2 a plan, and Fig. 3 a sectional front elevation of a cruller cutting machine made in accordance with my improvements. Fig. 4 is a cross section of a drum provided with one variety of cruller cutters or dies, and with means for ejecting the blanks cut by the dies. Fig. 5 is a sectional detail showing the end of the drum seen at Fig. 4, together with a portion of the blank-ejecting mechanism. Fig. 6 is a perspective view of a die, with its individual ejectors. Fig. 7 is a perspective view of a fragment of a die, with its ejector.

In the several views, like parts are identified by like signs.

A table 1, for receiving the dough, is supported upon the front end of a framework comprising a bed 2 and legs 3, 4 and 5. From this table runs rearwardly an endless dough-conveying belt 6, said belt at its forward end passing around a pulley 7, adjacent to the table 1. The belt with the dough thereon first runs between a pair of rolls 8, 9, which usually roll the dough into a plate of a thickness of about half an inch. For regulating the thickness of the plate, the upper roll may be adjusted, the roll being journaled in a pair of vertically movable blocks 10, whose position is controlled by vertical screws 11. Should any of the dough stick to the upper roll, it is cleaned off by a stripper 12, which is in the form of a knife blade set longitudinally of the roll in contiguity to the rear under side thereof. The plate of dough is then conveyed by the belt beneath a flour-sprinkler or sifter consisting of a box 13, having a lid 14 upon its top, and formed with a bottom consisting of a sieve 15. This sifter, which extends across the machine and is guided in ways 16, 17, by means of end slides 18, 19, is reciprocated by a pitman 20, connected at one end to a pin 21 on the slide 18, and at the other end to a wrist pin 22, projecting from a disk 23, the latter being revolubly mounted in a bracket 24, and rigid with a miter gear 25, whereby it is rotated and the pitman is caused to drive the sifter. By this means the upper side of the plate of dough is dusted with flour, which tends to prevent the same from sticking to the devices which subsequently operate thereon. The dough is next conveyed by the belt between a second pair of rolls 26, 27, whereby the thickness of the plate is reduced to about three-eighths of an inch, whereby it is partly formed or molded and ready to be cut up into crullers or cruller blanks, thus completing the molding or forming of the material. The upper roller 26 of the pair, is adjustable by means of blocks 28 and screws 29; and a stripper 30 is also provided. Said rolls 26 and 27 are provided with meshing gears 31 and 32, the latter being connected by an idle gear 33 with the main driving gear 34, which is fixed upon the main shaft 35, carrying fast and loose belt-pulleys 36 and 37 (Fig. 2.) An idle gear 38 connects gear 32 with a gear 39 rigid with the roll 9, said gear 39 also meshing with a companion gear 40 upon the upper roll 8. It should also be mentioned that the shaft 41 of the roll 27 is provided with a driving pinion 42, connected by means of an idle pinion 43 with a pinion 44 mounted upon a shaft 45, which carries a miter gear 46 in mesh with the miter gear 25, the latter being thus given constant rotation during the operation of the machine.

From the second pair of rolls, the belt conveys the plate of dough between a pair of drums whereby the forms or blanks are cut out of the dough, the upper drum 47, mounted on a shaft 48, being provided with the cutters or dies, and the lower drum 49 being fixed upon the main driving shaft 35. The dough forms or molds are ejected from the cutting drum, and fall upon the rear portion of the conveyer belt, said portion inclining downwardly from the drum 49, as at 50, and passing over a small pulley 51, whence it returns to the pulley 7; a suitable tightener being provided to act upon this part of the belt, and comprising a lever 52, operated by a spring 53, and carrying a roll 54 to press the belt taut. When discharged by the conveyer belt, the forms may slip down over an inclined plate 55, supported upon a rod 56, and be received by an auxiliary short conveyer belt 57, whence they are finally discharged upon trays 58. The movement of the belt 57, which runs over pulleys 59 and 60, may be effected by an idle pinion 61 rigid with the pulley 60, and connected by an idle pinion 62 with a pinion 63 upon the shaft of pulley 51, said pinion 63 being connected by an idle pinion 64 with the main driving gear 34. It will be observed that the plate 55 and belt 57 are sufficiently inclined to properly conduct the dough forms to the platters or trays 58. The latter may be set by the attendant upon a conveyer belt 65, running upon pulleys 66, 67, 68, 69 and 70, the latter being the driving pulley and having a pinion 71, connected by an idle gear 72 to the gear 32. Suitable tightening means may be provided for the belt 65, as indicated at 73. As the trays are carried along by said belt, they become gradually filled, when they are removed by the attendant, an empty tray being placed upon the forward end of the belt when a filled tray is taken from the rear end. Suitable side-guards 74 extend from end to end of the machine, flanking the conveyer belts 6 and 57.

Referring now to the drum 47, which may be seen in plan at Fig. 2 and in cross section at Fig. 4, it will be observed that said drum is provided with longitudinal rows of form-cutters or dies, each consisting of an outer annular cutting blade 75, for cutting the contour of the cruller-blank, and an inner annular cutting blade 76, for cutting a disk out of the form and leaving a central hole therein. At Fig. 4 it will be seen that the edge of the cutter 75 curves concentrically with the drum shaft 48, and that its opposite sides are radial, the form being such as to produce a symmetrical disk of dough.

Within the central cutter 76 is a cylindrical plunger or ejector 77, having a central guiding-stem 78, working in a radial socket 79, of which one is formed in the drum 47 for each die. Said plunger is also formed or provided with a large flange 80, upon which is secured by screws 81 an annular ejector 82, occupying the space between the inner and outer cutting rings. Hence by an outward movement of the ejectors, both the cruller ring and the central disk may be ejected and cast upon the portion 50 of the main conveyer belt. The central cutter 76 is supported by means of four legs 83 (Figs. 6 and 7), passing through apertures 84 formed in the flange 80, and having perforated feet 85 attached by screws to the face of the drum, as at Fig. 4, the latter being preferably formed with a number of plane sides, one for each row of dies, and being shown in this instance as octagonal in cross section. The outer cutter 75 is secured by means of an interior flange 86, which fits around the feet 85.

The ejectors are worked by means of bars, one bar extending along each row of ejectors, longitudinally of the drum. These bars may be in the form of cylindrical rods 87, passing through perforations 88 formed in the base portions of the plungers 77 (Figs. 4 and 7), so that by an outward movement of the bar, an entire row of blanks is ejected from the drum. The movement of the rods or bars is effected by means of a pair of stationary face-cams 89, formed upon the inner faces of a pair of disks 90, the bars being preferably provided with cam-rollers 91 (Fig. 5). The cams are similar and coincident, so that during the rotation of the drum, the ends of each bar are similarly acted upon, and the bars are one by one forced out and retracted, together with the ejectors connected thereto. The cams may be so adjusted as to cause the ejecting movement to occur immediately after the forms are cut from the plate of dough, the ejectors being retracted in time for the next cut to be made by the same dies.

The dies are shown at Figs. 2 and 4 as contiguous one to another, so that only a very small proportion of scrap is formed from the sheet of dough, which is an important advantage. These scraps I dispose of by means of a drum or cylinder 92, provided at suitable points with pickers 93, in position to pick the scraps out from between the dies; said drum 92 being provided with a pinion 94 in mesh with the gear 95 which is fixed upon the shaft 48 of the die drum 47 and meshes with the main driving gear 34. A stripper 96 is provided for the drum 92, said stripper having suitable notches for the clearance of the pickers upon the drum. The latter, with the stripper, are mounted upon a frame 97, adapted to be slid upon ways 98 to a position of disuse, when not required.

For cutting still other forms from the dough, I provide additional cutter drums, one whereof is designated as 99, and is provided with simple annular cutters 100 for cutting plain disks. Within these cutters are ejector-plates or disks 101, connected to and operated by bars 102, similar to the bars 87, and engaging similar cams formed in disks 103. The picker cylinder 92 is adapted to coöperate with the drum 99, as well as the drum 47; but when the other drums shown are in use, said cylinder may be moved back out of the way. Two other drums are shown, one designated as 104 and provided with dies 105 for cutting rectangular blanks, and the other 106 being adapted to produce similar blanks, but having dies 107 for cutting holes in them. The last-mentioned drums are also provided with suitably formed ejectors, operated by ejector bars, the latter engaging cams formed in disks 108 and 109.

Any one of the four cutter drums may be brought into working position, since they are all journaled upon a single revoluble frame, which comprises a central shaft 110 and a pair of end plates heads or frames fixed thereto and designated as 111 and 112. The axes of the cutter drums are equidistant from the shaft 110, so that it is only necessary to revolve said frame, with the drums thereon, to bring any required drum into position for coöperation with the drum 49. I provide a pair of locking-pins or screws 113, one at each side of the shaft 110, and adapted to enter sockets or threaded holes 114 formed in bosses 115 upon the revoluble frame, said pins or screws passing through bosses 116 formed upon the framework of the machine, and securely retaining the drum-carrying frame in any of the four positions required. The shaft 117 of drum 99 carries a driving gear 118 adapted to mesh with the main driving gear 34; while the shaft 119 of drum 104 carries a similar gear 120, and shaft 121 of drum 106 a similar gear 122. The several cam plates may be secured to the plates of the revolving frame by means of suitable brackets 123.

The drum-carrying frame, and hence any of the drums which is in use, may be adjusted relatively to the coöperative drum or support 49, by means of screws 124, which control vertically movable blocks 125 in which the shaft 110 is journaled. By this means the right pressure between the coöperating drums may be secured.

Variations may be resorted to within the scope of my invention, and portions of my improvements may be used without others.

Having thus described my invention, I claim:

1. The combination with a drum, of dies thereon each comprising an outer and an inner annular cutting blade, the former surrounding the latter, outer and inner ejectors in said dies, and means for operating said ejectors.

2. The combination with a drum, of dies thereon each comprising an outer and an inner annular cutting blade, the former surrounding the latter, outer and inner connected ejectors in each die, and means for operating said ejectors.

3. The combination with a drum, of dies mounted thereon in rows and each comprising an outer and an inner annular cutting blade, the former surrounding the latter, outer and inner connected ejectors in each die, bars extending along said rows and connected to said ejectors, and means for operating said bars.

4. The combination with a drum, of dies mounted thereon in rows and each comprising an annular outer cutting blade which is attached to the drum and an annular inner cutting blade which is provided with openings in its sides and is attached to the drum, an ejector within each of said outer blades, an ejector within each of said inner blades, arms extending through said openings to connect the inner to the outer ejectors, bars extending along said rows for operating said ejectors, and means for operating said bars.

5. The combination with a drum provided with dies and a coöperative drum, of an endless conveyer belt passing between said drums to be engaged forcibly by said dies, two pairs of rolls, a flour-sifter between said pairs, and a stripper for the upper roll of each pair; said belt passing between the rolls in each pair, and the rolls on one pair being set closer together than the rolls in the other pair.

6. The combination with a drum provided with dies, of means for removing the dough from the dies, and a drum having means for removing the scraps of dough only from between the dies.

7. The combination with a drum provided with dies, of means upon the drum for ejecting the dough from the dies, and a drum having pickers in position to pick the scraps only from between the dies.

8. The combination with a drum provided with dies, of means for ejecting the dough from the dies, a drum having pickers in position to pick the scraps from between the dies, and a stripper for said picker drum.

9. The combination with a drum provided with dies, of ejectors upon said drum, a drum of smaller diameter geared thereto and having pickers, and a stripper for said picker drum.

10. The combination with a drum provided with dies, of a conveyer belt for conveying a plate of dough to the drum, means supporting the belt against the pressure of the dies, ejectors upon the drum, a platter conveyer, and means for moving said conveyer.

11. The combination with a drum provided with dies, of an endless conveyer belt, a roll supporting said belt against the pressure of the dies, ejectors upon said drum, a device for picking scraps from said drum, a second belt for conveying the blanks cut out by said dies, a platter conveyer, and means for moving said platter conveyer.

12. The combination with a drum having round dies mounted thereon in contiguity, of a drum geared to said drum and provided with pickers only to take the scraps from between said dies.

13. The combination with a drum having round dies mounted thereon in contiguity, and provided with ejectors, of a drum geared to said drum and provided with pickers for forcibly removing the scraps of dough from between said dies.

14. The combination with a drum having round dies mounted thereon in contiguity, of plungers for removing the dough from within the dies, and pickers for removing the dough scraps forcibly from between the dies.

15. The combination with means for feeding plastic material, of a plurality of drums provided with dies, the dies upon one drum being different from those upon the other, and means for enabling the movement of either drum into action and the other simultaneously out of action.

16. The combination with means for feeding plastic material, of a plurality of drums provided with dies, a coöperative drum or support, and means for holding either member of said plurality in position to coöperate with said coöperative drum while the remaining drums are silenced.

17. The combination with means for feeding plastic material, of a plurality of drums provided with dies, and means for rendering either drum effective at will and simultaneously silencing the other drum.

18. The combination with a dough-conveying belt, a plurality of drums provided with dies, and a coöperative drum, of means for gearing either member of said plurality to said coöperative drum at will.

19. The combination with means for feeding dough, of a plurality of drums provided with dies, and a frame whereon said drums are mounted; said frame being shiftable to enable either member of said plurality to be put into action.

20. The combination with means for feeding dough, of a plurality of drums provided with dies, a journaled frame whereon said drums are journaled, and means for securing said frame in various positions, to enable either member of said plurality to act, at will.

21. The combination with a plurality of drums provided with dies, of a frame whereon they are journaled, a coöperative drum or support, and means for effecting adjustment of one of said frame and coöperative drum elements, to regulate the action of the dies; said coöperative drum and said frame being mounted for relative movement to bring either drum into action.

22. The combination with means for feeding plastic material, of a plurality of drums provided with dies, means for throwing either drum into action and the other simultaneously out of action, and adjustable devices for regulating the action of the dies.

23. The combination with means for feeding dough, of a plurality of drums provided with dies, a journaled frame whereon said drums are journaled, means for securing said frame in different positions, to enable any drum thereon to act, and means for adjusting said frame to regulate the die action.

24. The combination with means for feeding dough, of a plurality of drums provided with dies, means for enabling either drum to be put into action and the other out of action at will, and means for discharging the dough from the dies.

25. The combination with means for feeding dough, of a plurality of drums provided with dies, a coöperative drum or support, means for enabling either member of said plurality to coöperate with said coöperative drum, adjustable means for regulating the die action, and means for ejecting the dough from the dies.

26. The combination with means for feeding dough, of a plurality of drums provided with dies, a frame whereon said drums are journaled, said frame being mounted so that either drum may be thrown into action, ejectors within said dies, and means for operating said ejectors.

27. The combination with means for feeding dough, of a movable frame, and a plurality of drums thereon; dies mounted in rows upon each drum, ejectors within said dies, ejector bars extending along said rows, and cams for operating the ejector bars.

28. The combination with means for feeding dough, of a journaled frame, a plurality of drums journaled thereon, cams upon said frame at the ends of said drums, dies mounted in rows upon said drums, ejectors within said dies, and ejector bars extending longitudinally of said drums and engaging said cams.

29. The combination with means for feeding dough, of a plurality of drums each provided with dies, means for bringing either drum into action at will, and means called into action by the rotation of the drums, for ejecting dough from the dies.

30. The combination with a pair of feed rolls and means for effecting relative adjustment thereof, of a conveyer belt passing between the rolls, a plurality of drums each provided with dies, a coöperative drum, means for enabling said coöperative drum to coöperate with either of said die drums at will, and means for effecting relative adjustment between said coöperative drums and said die drums, to regulate the action of the dies.

31. The combination with adjustable means for rolling dough to different thicknesses at will, of different sets of means for cutting different shapes from the dough at will and means for bringing either set into use and silencing the other set.

32. The combination with a conveyer belt and two pairs of rolls, said belt passing between the rolls in each pair, of means for adjusting a roll in each pair, to roll dough of different thicknesses, and means for cutting different shapes from the dough at will and silencing the other drum.

33. The combination with adjustable dough-rolling means, of a plurality of drums each provided with cutting dies, and means for bringing either drum into action at will.

34. The combination with means for feeding plastic material, of a plurality of drums having dies, means for moving either drum to working position, a drum having pickers for picking material from one of said drums, and means for enabling said picker drum to be moved out of working position.

35. The combination with means for feeding plastic material, of a plurality of drums having dies, means for ejecting the material from the dies, a drum having catches in position to pick the scraps from between the dies on one of said die drums, and means for enabling either of said die drums to be moved to working position.

36. The combination with adjustable means for rolling cruller-dough to different thicknesses at will, of a plurality of sets of means for cutting out differently shaped blanks from the dough, and means for silencing either set and rendering the other set effective.

37. The combination with adjustable means for sizing or rolling plastic material, of a plurality of drums each provided with cutting dies, and means for bringing either drum into action at will and silencing the other drum; each of said drums being provided with dies for cutting out blanks.

38. A machine for molding or forming plastic material, comprising a conveyer belt, means coöperating with said belt for gradually reducing the thickness of the material by rolling, said reducing means including a succession of rolls, a drum having thereon a set of cutters for cutting out ring-like blanks from the material; said cutters mounted to press against said belt; means supporting the belt against such pressure and means for ejecting the scrap from between the cutters.

39. A machine for molding or forming plastic material, comprising a conveyer belt, two pairs of rolls through which said belt runs, the second pair of rolls being set closer together than the first, a flour-sifter between said pairs of rolls, strippers for the upper rolls of the pairs, a drum having thereon a set of dies for cutting out ring-like blanks from the material; a drum which coöperates with said die drum and over which said belt runs, so that the dies run in forcible contact with the belt, and pickers for removing the scrap from the die drum.

40. A machine for forming or molding plastic material, comprising a material conveying belt, material rolling means coöperating therewith, a drum having thereon a set of dies for cutting out ring-like blanks from the material; each die comprising outer and inner annular cutters, the opposite sides of each of the outer cutters converging radially towards the drum axis; and a drum coöperating with said die-drum; said belt running over said coöperating drum and in forcible contact with the dies.

41. A machine for forming or molding plastic material, comprising a conveying belt, two pairs of rolls through which said belt runs, the rolls in one pair being relatively adjustable, and the second pair of rolls being set closer together than the first pair, a flour-sifter between said pairs of rolls, a drum having thereon a set of dies for cutting out ring-like blanks from the material; each die comprising outer and inner annular cutters, the opposite sides of each of the outer cutters converging radially towards the drum axis; a drum coöperating with said die-drum; said belt running over said coöperating drum and running in forcible contact with the dies; means operating to remove the ring-like blanks from the dies; and means for subsequently removing the scrap from the die-drum.

42. In a sizing and cutting machine for plastic material, the combination of a supporting bed, a series of sizing and cutting rolls, a plurality of said rolls being journaled in parallel relation above said bed in supporting heads, which in turn are journaled above said bed, means for locking said heads at points in their circular adjustment and means for feeding the material along said bed.

43. In a machine for forming or molding plastic material, the combination of a supporting frame, a bed secured to said frame, heads or supports journaled in said frame and adapted for a turning adjustment, forming or molding rolls journaled in parallel relation in said heads and including a cutting roll, and means for feeding the material along said bed.

44. In a forming or molding machine for plastic material, the combination of a supporting frame, a bed secured to said frame, heads or supports journaled in said frame and adapted for a turning adjustment, forming or molding rolls including a sizing roll and a cutting roll, a plurality of said rolls journaled in parallel relation in said heads, and a feed roll journaled in the main frame beneath the rolls which are journaled in said heads.

45. In a forming or molding machine for plastic material, the combination of a supporting frame, a bed secured to said frame, heads or supports journaled in said frame and adapted for a turning adjustment, forming or molding rolls including a sizing roll and a cutting roll, a plurality of said rolls being journaled in parallel relation in said heads, means for securing said heads at the required turning adjustment, and means for feeding the material along said bed.

46. In a forming or molding machine for plastic material, the combination of a supporting frame, a bed secured to said frame, heads or supports journaled in said frame and adapted for a turning adjustment, forming or molding rolls including a sizing roll and a cutting roll, a plurality of said rolls being journaled in parallel relation in said heads, means for securing said heads at the required turning adjustment, and a feed roll journaled in the main frame beneath the rolls in said heads.

47. In a forming or molding machine for plastic material, the combination of a supporting frame, a bed secured to said frame, heads or supports journaled in said frame and adapted for a turning adjustment, forming or molding rolls including a sizing roll and a cutting roll, a plurality of said rolls being journaled in parallel relation in said heads, means for imparting positive rotation to the rolls journaled in said head, and means for feeding the material along said bed.

48. In a forming or molding machine for plastic material, the combination of a supporting frame, a bed secured to said frame, heads or supports journaled in said frame and adapted for a turning adjustment, forming or molding rolls including a sizing roll and a cutting roll, a plurality of said rolls journaled in parallel relation on said heads, a feed roll journaled in the main frame beneath the rolls in said heads, and means for imparting positive rotation to the rolls journaled in said head and to the feed rolls.

49. A machine for rolling or sizing plastic material and forming blanks thereof, comprising a plurality of drums, each drum having means for acting differently from the other upon the material, and means for enabling the movement of either drum into action and the other simultaneously out of action.

50. A machine for rolling or sizing plastic material and blanking the same, comprising a support, a plurality of drums, and means for bringing either member of said plurality into coöperation with said support to act upon the dough carried by said support, while the other member of said plurality is silenced; each drum constructed to act differently from the other upon the material.

51. The combination with means for conveying dough, of a plurality of drums, each having means to act differently from the other upon the material, and a coöperative drum, of means for gearing either member of said plurality to said coöperative drum at will.

52. The combination with means for carrying dough, of a plurality of drums each having means to act differently from the other upon the material, and a frame whereon said drums are mounted; said frame being shiftable to enable either member of said plurality to be put into action.

THOMAS C. PATTERSON.

Witnesses:
B. C. STICKNEY,
EDWARD O. McCUE.